United States Patent [19]

Schmoock

[11] 4,388,834
[45] Jun. 21, 1983

[54] ELECTROMAGNETIC FLOWMETER HAVING A MONOLITHIC CONDUIT

[75] Inventor: Roy F. Schmoock, Yardley, Pa.

[73] Assignee: Fischer & Porter Company, Warminster, Pa.

[21] Appl. No.: 249,484

[22] Filed: Mar. 31, 1981

[51] Int. Cl.³ .............................................. G01F 1/58
[52] U.S. Cl. ............................................... 73/861.12
[58] Field of Search ..................... 73/861.12; 310/11; 428/36

[56] References Cited

U.S. PATENT DOCUMENTS 3,746,896 7/1973 Gruner ......................... 73/861.12 X
4,243,455 1/1981 Shiba et al. ........................ 428/36 X

FOREIGN PATENT DOCUMENTS 281843 11/1970 U.S.S.R. ........................... 73/861.12

Primary Examiner—Charles A. Ruehl
Attorney, Agent, or Firm—Michael Ebert

[57] ABSTRACT

An electromagnetic flowmeter which includes a pair of electrodes molded of electrically-conductive synthetic plastic material disposed at diametrically-opposed points in a flow tube through which the fluid being metered passes to intercept a magnetic field, thereby inducing a voltage in the electrodes that is a function of flow rate. The inner wall of the tube is protectively covered by an insulating liner molded of a synthetic plastic material having an affinity for the electrode material and fused to the periphery thereof to define a monolithic conduit which is leak-proof.

9 Claims, 13 Drawing Figures

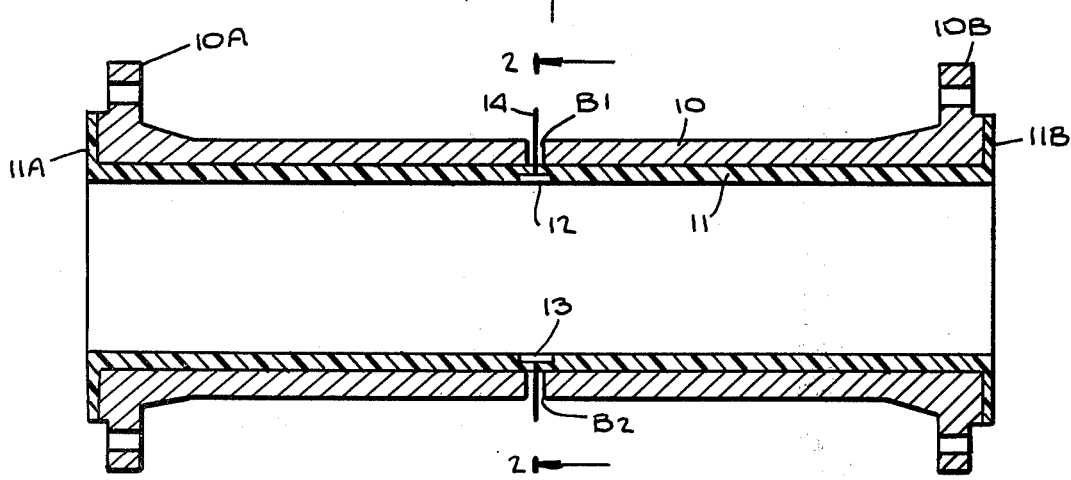
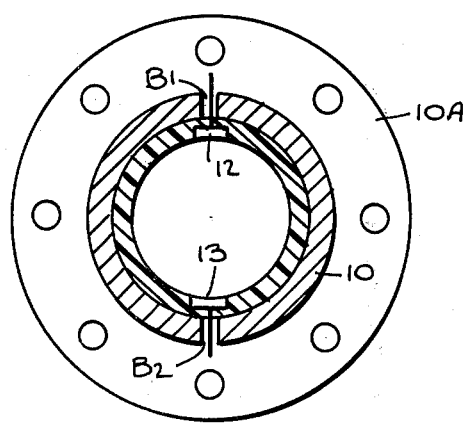
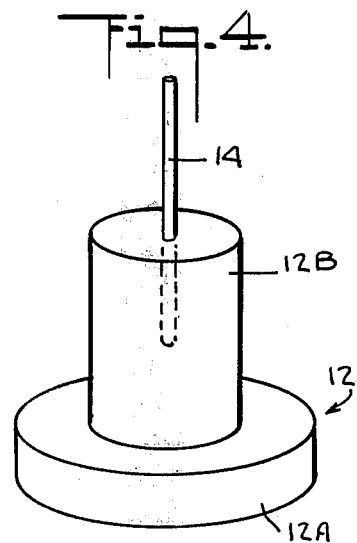
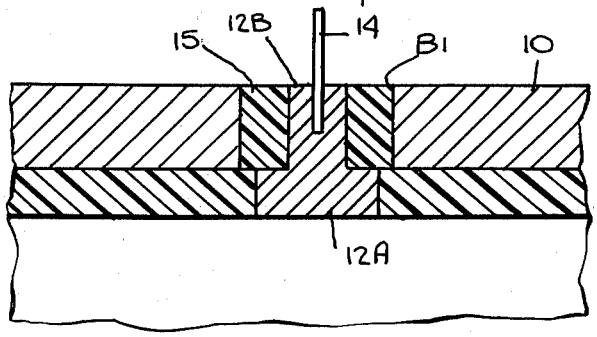

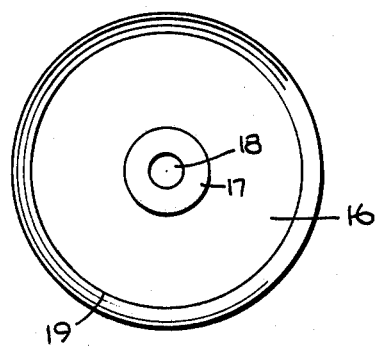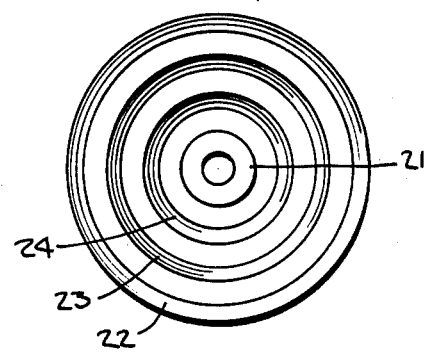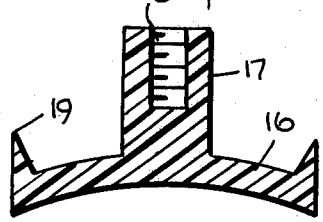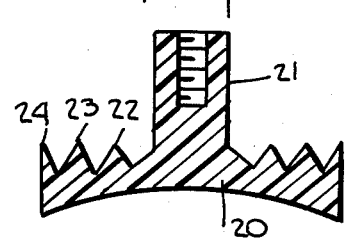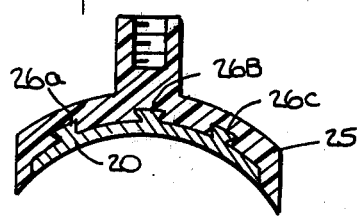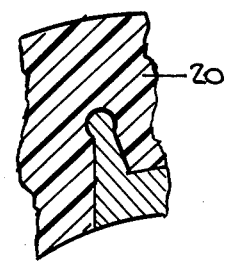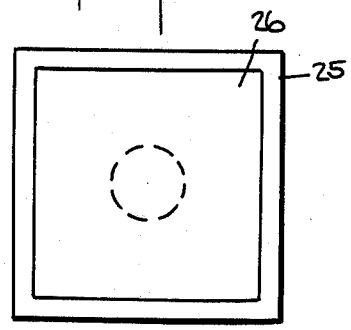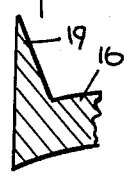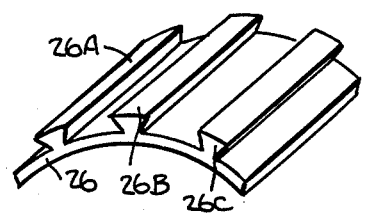

ELECTROMAGNETIC FLOWMETER HAVING A MONOLITHIC CONDUIT

BACKGROUND OF INVENTION

This invention relates generally to electromagnetic flowmeters, and more particularly to a flowmeter liner which is integrated with the flowmeter electrodes to define a monolithic conduit structure.

An electromagnetic flowmeter is adapted to measure the flow rates of those fluids which present difficult handling problems, such as corrosive acids, sewage slurries, detergents and the like. In a flowmeter of this type, the liquid whose flow rate is to be measured is conducted through a flow tube provided with a pair of diametrically-opposed electrodes, a magnetic field perpendicular to the longitudinal axis of the tube being established by a pair of diametrically-opposed electromagnets. When the flowing liquid intersects this field, a voltage is induced therein which is transferred to the electrodes. The voltage, which is proportional to the average velocity of the liquid and hence to its average volumetric rate, is then amplified and processed to actuate a recorder or indicator, or to supply an input variable to a process control system.

In a flowmeter of this type, such as that disclosed in the Schmoock et al. U.S. Pat. No. 3,839,912 (1974), it is common practice to install an electrically-insulating liner on the inner surface of the metal flow tube. The outer metal flow tube provides a structure capable of withstanding the operating pressures to which the meter is subjected, whereas the inner liner functions as the flow conduit.

Often employed as insulating liners are liners molded of fluorocarbon materials such as PTFE, PFA and FEP. Because fluorocarbons are non-reactive with virtually all corrosive fluids, they have desirable liner properties. But since the meter electrodes which conventionally are of metal must have their faces exposed to the liquid flowing through the conduit, the liner is indented to accommodate the metal electrodes, the geometry of the indentation conforming to the periphery of the electrodes.

While it is also the practice to cement the electrodes to the liner, because the materials thereof are dissimilar, it is difficult to produce a seal therebetween capable of withstanding the pressures encountered in flowmeters and of resisting the corrosive and abrasive actions of the fluids being metered. As a consequence, leaks are often developed at the interface of the electrodes and the liner. These leaks create serious operating problems, and in some instance may render the meter inoperative.

SUMMARY OF INVENTION

In view of the foregoing, the main object of this invention is to obviate the problem of leaky electrodes in electromagnetic flowmeters by providing therein a monolithic conduit in which the liner is integrated with the electrodes.

More particularly, an object of this invention is to provide a monolithic conduit constructed through a two-stage molding process: the first stage creating the electrodes, and the second a liner fused thereto.

Also an object of the invention is to provide a monolithic conduit of the above type with electrodes of any desired shape.

Briefly stated, these objects are attained by first injection-molding electrically-conductive synthetic plastic material into a pair of electrodes which are mechanically strong, resistant to most chemicals and abrasion-resistant. The electrodes so molded are then placed in a mold formed to create a cylindrical liner of the desired dimensions, into which mold is injected an insulating material having an affinity for the electrode material and having similar chemical and structural properties whereby a monolithic structure is produced in which the electrodes are fused to the liner at diametrically-opposed positions therein.

The term "affinity," as used herein, means a substance whose properties are such that when in the molten state and in contact with the surface of a previously molded piece, the relationship of this substance to the material of the piece causes the substance to fuse to the surface of the piece and become integral therewith.

OUTLINE OF DRAWINGS

For a better understanding of the invention as well as other objects and further features thereof, reference is made to the following detailed description to be read in conjunction with the accompanying drawings, wherein:

FIG. 1 is a longitudinal section taken through a flowmeter tube having a monolithic conduit structure therein in accordance with the invention;

FIG. 2 is a transverse section taken in the plane of lines 2—2 in FIG. 1;

FIG. 3 is a longitudinal section through one of the electrodes fused to the liner;

FIG. 4 is a perspective view of one of the electrodes;

FIG. 5 is a section taken through another version of a molded electrode in accordance with the invention;

FIG. 6 is a plan view of the electrode shown in FIG. 5;

FIG. 7 is a section taken through still another version of the electrode;

FIG. 8 is a plan view of the electrode shown in FIG. 7;

FIG. 9 is an enlarged view of the edge of the electrode shown in FIG. 5;

FIG. 10 illustrates the edge formation after the electrode is integrated with the liner;

FIG. 11 shows in section an electrode having a metal insert therein;

FIG. 12 is a perspective of the metal insert; and

FIG. 13 is a bottom plan view of the electrode shown in FIG. 11.

DESCRIPTION OF INVENTION

A monolithic conduit structure in which conductive electrodes are integrated with an insulating liner is usable in all existing forms of electromagnetic flowmeters which require a flow tube having an inner liner.

Metal flow tube 10 having a circular cross section, which is shown in FIG. 1 by way of example, includes end flanges 10A and 10B provided with a circle of bolt holes to couple the tube to upstream and downstream pipes in a pipeline carrying the fluid to be metered. The flowmeter also includes an electromagnet, but this is not shown. It is to be understood, however, that the monolithic structure is also applicable to flangeless flowmeters and to other devices which require electrodes or other conductive elements fused to an insulating layer.

The monolithic structure in accordance with the invention is constituted by a cylindrical liner 11 which conforms to the inner wall of flow tube 10, the ends of the liner being flared outwardly to provide liner flanges 11A and 11B which rest against the corresponding tube flange and are sandwiched between intercoupled flanges when the flowmeter is interposed in a flow line.

Liner 11 is molded of a synthetic plastic material which has good electrical-insulating properties and also has non-reactive chemical characteristics appropriate to the handling of corrosive fluids. Preferably used for this purpose are liners fabricated of a material in the fluorocarbon family, such as materials bearing the trademarks Teflon, Kel-F, Alcar, Halon and Fluorel. These material are highly resistant to chemicals and oxidation, they have a broad and useful temperature range (up to 350° F.) as well as a high dielectric constant. Their structure comprises a straight backbone of carbon atoms symmetrically surrounded by fluorine atoms.

Integrated with liner 11 at diametrically-opposed positions which correspond to the position of bores $B_1$, $B_2$ in the flow tube are electrodes 12 and 13. Each electrode, as shown separately in FIG. 4, is in the form of a round button 12A provided with a central stem 12B having a hole therein to receive a lead wire 14. The invention is not limited to the electrode form illustrated and is applicable to all electrode geometries suitable for electromagnetic flowmeters, such as point electrodes and electrodes having a rectangular, oval or other configuration. Since the electrode stem 12B is seated within the bore in metal flow tube 10 and is conductive, it must be insulated from the flow tube, an insulating bushing 15 being provided for this purpose, as shown in FIG. 3.

Electrodes 12 and 13 are molded of a synthetic plastic material having electrically-conductive properties, the material having an affinity for the material of the liner so that when the liner is molded about the periphery of the electrode, it fuses thereto to create a permanent bond at the interface of the electrode periphery and the liner. To this end, the electrodes are preferably formed of a fluorocarbon material having a composition similar to that of the liner, save for its conductive properties.

A preferred material for both electrodes and liner is "KYNAR," produced by Pennwalt Corporation of Philadelphia, Pa., this material being a fluorocarbon resin in the form of a crystalline, high molecular weight polymer vinylidene fluoride containing 59% fluorine by weight. Kynar is highly resistant to virtually all corrosive chemicals and is particularly effective against halogens, oxidants, strong bases and acids. It is mechanically strong and has outstanding resistance to abrasion so that it is capable of handling corrosive slurries whose dispersed particles are somewhat abrasive.

Kynar is available both in electrically-conductive and insulating compositions. Thus Kynar 5200 is a dielectric material suitable for the liner, whereas Kynar 320 is somewhat conductive and is suitable for the electrodes, Kynar 3108 being even more conductive. For flowmeter applications, the electrodes need not have the high conductivity of a metal such as copper, aluminum or bronze, and may be an electrically resistive material. The term "electrical conductivity," as used herein, covers electrodes which are not highly conductive, but of resistive material having sufficient conductivity for the intended application.

In forming the monolithic structure, it is first necessary to mold the electrodes, preferably by an injection-molding technique in which preheating, plasticizing and shaping are all carried out by the same machine, the material suitable for this purpose being a thermoplastic of high fluidity. After the electrodes are fabricated, they are placed in a mold designed to create the liner at the proper diametrically-opposed positions therein, so that when the liner material is injected it flows about the periphery of the electrodes whose faces are exposed. The liner material then fuses to the periphery to integrate the electrodes into the liner structure. The resultant monolithic structure forms a leak-free conduit which avoids the electrode leakage problems encountered when discrete electrodes are employed.

Modification of Electrodes:

In order to assure fusing the entire diameter of the molded electrodes with the insulated liner, in the form of electrodes shown in FIGS. 5 and 6, the circular electrode 16, which has a central stem 17 and a tap 18 therein, is provided along its periphery on its inner face with an annular rib 19. As best seen in FIG. 9, rib 19 has a sharp triangular cross section so that its apex has a knife edge.

Electrode 16 is made of a synthetic plastic such as Kynar, having conductive properties, and is molded to the desired shape. When a liner 20 of insulating material is thereafter molded about the periphery of electrode 16, the heat accompanying this action acts on the knife edge of the rib to cause melting thereof. Thus the knife edge of the electrode constitutes a melt line. As a consequence, as shown in FIG. 10, the softened knife edge becomes somewhat rounded and total fusion of liner 20 thereto is assured. Electrode 16 has a concave front face to conform to the curvature of the unit.

In FIGS. 7 and 8, melt line redundancy is provided to further enhance fusion of the liner to the electrode. To this end, instead of a single inner rib, molded electrode 20, which includes a central stem 21, is further provided with three concentric ribs 22, 23 and 24 which define melt lines.

As noted in the Mannherz patent application Ser. No. 152,479, filed May 22, 1980, (now U.S. Pat. No. 4,296,636), entitled "Noise-Reducing Electrodes for Electromagnetic Flowmeter," whose entire disclosure is incorporated herein by reference, when the fluid being metered is a slurry having foreign particles which impinge on the electrodes, this action tends to generate noise signals which interfere with the flow rate signal. To minimize such noise signals, Mannherz provides a metal carbide electrode having exceptional hardness.

In the electrodes shown in FIGS. 11, 12 and 13, the molded plastic electrode 25 which has a square formation and a concave face, is provided with a metal insert 26. This insert is fabricated of tungsten carbide, sintered tantalum or other metal of exceptional hardness to minimize the generation of noise when the fluid being metered is a slurry. Insert 26 is provided with parallel teeth 26A, 26B and 26C so that when the plastic electrode is molded thereabout, the teeth act to retain the insert.

While there has been shown and described a preferred embodiment of an electromagnetic flowmeter having a monolithic conduit in accordance with the invention, it will be appreciated that many changes and modifications may be made therein without, however, departing from the essential spirit thereof. Thus while the flowmeter illustrated herein shows a metal flow conduit having a Kynar liner therein, the liner may be installed in a flowmeter having a molded plastic flow conduit, in which case all voids surrounding the Kynar liner-conduit are filled with an epoxy compound in order to insure a high pressure capability.

I claim:

1. A monolithic structure comprising at least one electrode pre-molded of flowable synthetic thermoplastic material having electrically conductive properties, said molded electrode having a periphery of predetermined shape and a layer molded about the periphery of the electrode and fused thereto, the layer being formed of a flowable synthetic thermoplastic material having an affinity for the electrode material and flowing about said periphery to be fused thereto, the layer material having electrical insulating properties.

2. A structure as set forth in claim 1, wherein said electrode and layer are formed of a fluorocarbon resin.

3. A structure as set forth in claim 2, wherein said resin is a polymer of vinylidene fluoride.

4. A structure as set forth in claim 1 for use as a conduit to line the inner surface of the flow tube of a magnetic flowmeter, the layer being in the form of a tubular liner having integrated therein a pair of metering electrodes disposed at diametrically opposed positions on said liner, each metering electrode being constituted by said electrode molded of flo7able thermoplastic material.

5. A structure as set forth in claim 4, wherein said liner is provided at either end with flanges.

6. A structure as set forth in claim 4, wherein said metering electrodes have a circular form.

7. A structure as set forth in claim 4, wherein said metering electrodes have a non-circular form.

8. A structure as set forth in claim 6, wherein said metering electrodes have at least one annular rib on their inner face to promote fusion of the electrodes to the liner.

9. A structure as set forth in claim 1, wherein each electrode includes a metal insert to reduce the generation of noise resulting from the presence of particles in the fluid being metered.

* * * * *

UNITED STATES PATENT OFFICE
CERTIFICATE OF CORRECTION

Patent No. 4,388,834                    Dated June 21, 1983

Inventor(s) Roy F. Schmoock

It is certified that error appears in the above-identified patent and that said Letters Patent are hereby corrected as shown below:

Column 5, line 14 "theinner" should read --the inner--

Column 6, line 1 "flo7able" should read --flowable--

Signed and Sealed this

Sixth Day of December 1983

[SEAL]

Attest:

Attesting Officer

GERALD J. MOSSINGHOFF

Commissioner of Patents and Trademarks